United States Patent [19]

Johnson et al.

[11] Patent Number: 5,149,565
[45] Date of Patent: Sep. 22, 1992

[54] ADDITIVES FOR LEAD-FREE FRITS

[75] Inventors: Ronald E. Johnson, Tioga, Pa.; Kenneth A. Kirk; Kathleen A. Wexell, both of Corning, N.Y.

[73] Assignee: Corning Incorporated, Corning, N.Y.

[21] Appl. No.: 785,484

[22] Filed: Oct. 31, 1991

[51] Int. Cl.$^5$ .............................................. B05D 7/00
[52] U.S. Cl. ................................. 427/215; 427/376.2
[58] Field of Search ............................ 427/215, 376.2

Primary Examiner—Bernard Pianalto
Attorney, Agent, or Firm—C. S. Janes, Jr.

[57] ABSTRACT

This invention is drawn to a method for eliminating the grayish discoloration which customarily develops when lead-free and cadmium-free glass frits are applied to substrates employing an organic vehicle and which are thereafter fired to fuse the frit particles into a glaze. The grayish hue results from a carbonaceous residue left upon thermally decomposing the organic vehicle. The inventive method comprises five general elements:

(a) glass frit particles of a desired composition are prepared;
(b) a coating of an organic compound containing at least one sulfur oxide group as an oxidizing agent is adsorbed on the surface of the particles;
(c) the coated particles are mixed with an organic vehicle;
(d) that mixture is coated onto a surface of a substrate; and
(e) that coated substrate is fired to fuse the frit particles into a glaze, the oxidizing agent eliminating the carbonaceous residue left upon thermal decomposition of the organic vehicle.

12 Claims, No Drawings

1

ADDITIVES FOR LEAD-FREE FRITS

BACKGROUND OF THE INVENTION

The use of glazes to provide decorative designs and finishes to the surfaces of glass, glass-ceramic, and ceramic articles had its genesis in antiquity for ceramic articles and they have been used for many years in decorating glasses and glass-ceramics. Glazes are transparent glasses which are conventionally applied to a surface in the form of finely-divided particles, customarily termed "frit", which particles are subsequently fired to a temperature sufficiently high to fuse to and develop a well-bonded, continuous glassy coating on the surface.

Commercially marketed glazes have normally contained relatively large concentrations of lead oxide (PbO) and, less frequently, rather substantial levels of cadmium oxide (CdO), each of those oxides demonstrating two properties rendering them particularly desirable as components in glazing frits. First, they act as fluxes; i.e., they reduce the melting point of the glass so it is capable of flowing along the surface of an article at a temperature which is low enough to avoid thermal deformation of the article. Second, they raise the refractive index of the glass thereby enhancing the gloss exhibited by the glaze. In addition, CdO has been utilized as a colorant in certain frit compositions. Both PbO and CdO are highly toxic, however, such that very stringent regulations have been promulgated by the Food and Drug Administration with respect to their release when compositions containing those metals come into contact with comestibles.

It has been apparent that only through the total removal of those metals from the glaze compositions would the problem of their toxicity be finally solved. Therefore, extensive research has been directed to the formulation of lead-free and cadmium-free frits which would be operable as glazes for glass, glass-ceramic, and ceramic surfaces. It can be appreciated, however, that the absence of PbO and/or CdO from the frit compositions has mandated their replacement with other constituents to confer the desired physical and chemical properties to the glazes. Thus, the frit must exhibit the following characteristics, besides manifesting an aesthetically appealing appearance:

(a) the frit must demonstrate good glass stability; i.e., it will not devitrify during the firing to coat the surface of a body;

(b) the frit must display excellent resistance to attack by acids and bases so as to avoid corrosion of the glaze coating which can result in loss of gloss, the generation of haze and/or iridescence, the development of porosity, or other defects deleterious to the appearance and/or physical character of the glaze;

(c) the fusing or maturing temperature of the frit, viz., the temperature at which the frit will exhibit sufficient flow to produce a smooth homogeneous coating, must be low enough such that thermal deformation of the article being coated is avoided;

(d) the linear coefficient of thermal expansion of the frit must be compatible with that of the surface being coated to avoid crazing and/or spalling, with the preferred frits exhibiting a linear coefficient of thermal expansion slightly lower than that of the article being coated so as to place the matured glaze in compression when the coated article is cooled to room temperature; and, if a glaze displaying a high gloss is desired, (e) the refractive index of the frit ought to be significantly higher than that of the surface being coated; and, if the glaze-coated ware is to be used in food and beverage service and storage applications, e.g., for use as culinary ware and/or dinnerware, (f) the frit must demonstrate high resistance to attack by acids and bases present in foods and beverages and by detergents such as are found in commercial dishwashers.

Formulations of frit compositions containing no lead and cadmium have been marketed commercially. Those frits, however, have conventionally been plagued by a particular problem; viz., each has displayed a grayish tint in the "water white" or colorless state when fired in accordance with schedules normally employed. Thus, when the glazes are observed in the transparent, colorless state, i.e., no color pigment has been intentionally added thereto, they display an undeniable grayish discoloration. As can be readily appreciated, a grayish hue is undesirable when a "water white" glaze is sought, and the presence of the gray discoloration deleteriously affects the purity of color pigmented glazes.

The customary procedure for glazing the surfaces of articles contemplates mixing frit of a desired composition (which may contain a color pigment) with an organic liquid, such as an oil or other vehicle which many also contain an organic binder, surfactant, extender, etc. That suspension of frit and medium is applied to the surface of the article and subsequently fired at a sufficiently high temperature and for a sufficient period of time to cause the frit to fuse and flow and thereby produce a defect-free coating on the article.

Scanning auger spectroscopy examination of the gray glazes indicated the presence of clumps or pockets of carbonaceous residue interspersed within the glassy phase. Stated in another way, the grayish hue is the result of incomplete removal of a carbonaceous residue produced during the maturing of the glaze. The mechanism underlying the problem has been explained thusly: because the frit particles sinter (fuse) into a solid glaze before the organic medium is completely eliminated during the firing step, a carbonaceous residue is trapped within the glassy phase which confers the grayish tint to the glaze.

Three general approaches toward solving the graying problem have been investigated: (a) milling (comminuting) the frit particles to gain an optimum mix of particle sizes; (b) selecting special organic media; and most importantly (c) modifying the parameters of the firing process. The last approach has customarily comprehended slowing the firing schedule and/or utilizing special gaseous atmospheres during the firing operation. It is readily appreciated that each of those approaches adds additional cost to the process and, consequently, exerts a negative economic impact on commercial production.

U.S. application Ser. No. 07/724,125, filed Jul. 1, 1991 by J. M. Nigrin et al. under the title ADDITIVES FOR LEAD- AND CADMIUM-FREE GLAZES, and U.S. application Ser. No. 07/724,126, filed Jul. 1, 1991 by J. M. Nigrin et al. under the title TRANSPARENT LEAD- AND CADMIUM-FREE GLAZES, provide two different solutions to the graying problem.

The former application discloses a method wherein the frit particles are coated with a strongly oxidizing metal species prior to being blended into the organic vehicle. When the frit is fired, the adsorbed metal species oxidizes the carbonaceous residue, thereby eliminating it. As expressed in terms of metal oxide, the preferred oxidizing metal species are selected from the group of $Mn_2O_3$, $SnO_2$, $TiO_2$, and $ZnO_{1-x}$.

The method described in the latter application involved including a substantial amount of tin oxide in the frit composition itself to act as an oxidizing agent as the frit is fired into a mature glaze.

As can be recognized from the above brief descriptions, each method required the addition of a substance not present normally in conventional frit and which remains in the matured glaze. Such additions, although relatively small in amount, exert a material effect upon the properties of the frit and the matured glaze which require compensating changes in the other components of the frits.

Therefore, the principal objective of the present invention was to find a means for treating lead-free and cadmium-free frits such that they could be rapidly fired to mature glazes without the development of a grayish discoloration, which means would not involve adding a substance to the frits which is not customarily present in conventional frit compositions and which remains in the matured glaze.

A second, but quite obviously an extremely important objective, was to accomplish the above principal objective while, at the same time, assuring that the resultant glazes retain the several critical chemical and physical properties delineated above.

SUMMARY OF THE INVENTION

As was explained in the brief descriptions of the above two invention disclosures, each contemplates a material addition to the base frit composition. As such, each addition influences to some extent the chemical and physical characteristics of the precursor frit and the matured glaze, besides increasing the cost thereof. Accordingly, the goal of the present research was to devise yet another means to eliminate the grayish discoloration customarily developed during the rapid maturing of frits free of lead and/or cadmium; that means not involving the addition of a substance outside of those conventionally comprising frit components which remains in the matured glaze. Thus, inasmuch as the additive would not become a component of the final glaze, it would not substantively affect the properties of the glaze.

We have found that the most effective means to achieve that goal is through the adsorption of an organic compound containing at least one sulfur oxide group as an oxidizing agent onto the surfaces of the frit particles prior to the firing operation. The alkali metal and ammonium salts of sulfated or sulfonated organic compounds have been found to be particularly effective. Three vital requirements must be met by the additives to be operable.

First, the organic compound containing at least one sulfur oxide group must adsorb onto the surface of the frit particles.

Second, the stated organic compound does not itself form an excessive carbonaceous residue upon thermal degradation; that is, the sulfated or sulfonated organic compound does not of itself form a residue upon thermal degradation sufficient to consume the oxygen made available from the sulfur oxide-containing groups present in the compound.

Third, the degradation burnout temperature [Differential Thermogravimetric (DTG) peak] of the stated organic compound is in the same range as that of the other organic constituents of the glazing medium. Thus, it has been concluded that the sulfur oxide-containing groups oxidize the organic constituents during the degradation process of the organic medium, thereby reducing the grayish discoloration. Laboratory experimentation illustrated that an oxidizing agent can itself volatilize during the firing operation. Consequently, the oxidizing agent must be so selected that it is still present when the other ingredients of the organic medium are undergoing their degradation/burnout reactions.

Adsorption of the oxidizing material onto the surfaces of the frit particles is advantageous for at least the following two reasons:

First, the adsorption of the oxidizing material reduces the adsorption onto the surfaces of the frit particles of other carbon-producing components. The adsorption of carbon-producing constituents tends to increase further the extent of carbon formation because the adsorbed materials are retained to higher temperatures in the firing process.

Second, having the oxidizing agent at the interface between the frit and the organic material of the vehicle, rather than dispersed throughout the vehicle, is also believed to be highly advantageous because the pyrolysis/thermal degradation reactions occurring in the interface region are affected by the frit surface, which surface can be reducing in nature. For example, experience has indicated that, when the same organic vehicle is brought into contact with lead-containing frits and lead-free frits and the frits are then fired into a mature glaze, more carbonaceous residue is formed with the lead-free frits. Hence, the pyrolysis/thermal degradation reactions taking place at the frit-vehicle interfacial region are more reducing in the case of the lead-free frits. This observation is further supported by the fact that adding tin oxide to the glaze composition, as disclosed in Ser. No. 07/724,126, supra, or preadsorbing a tin-containing organic species onto the surface of the glaze particles, as described in Ser. No. 07/724,125, supra, enhances oxidation at the interface and reduces grayness, whereas simply adding tin oxide as a finely-divided powder dispersed throughout the organic medium has very little, if any, effect on grayness Consequently, having an oxidizing agent in that region is very beneficial in assuring elimination of carbonaceous residues Moreover, such positioning of the oxidizing agent helps to retain it in place while the ingredients of the vehicle are being burned out.

Nevertheless, whereas the prior adsorption of the sulfur oxide-containing organic compound onto the frit particles is very effective in eliminating the grayish discoloration, we have found that the direct mixing of the sulfur oxide-containing organic compound into the organic vehicle, followed by blending the frit particles into the mixture, can function to remove carbonaceous residues and, in some instances, appears to be comparable to the effect resulting from prior adsorption. This circumstance is believed to be due to the anionic character of many of the operable oxidizing agents which causes them to adsorb onto the surface of the frit particles as direct additions.

As was observed above, various sulfated and sulfonated compounds have been found to be especially effective in removing the grayish discoloration so long as they satisfy the following two criteria:

(1) their DTG peaks are within the same range of temperatures as that of the other constituents of the organic media employed; stated differently, in the same range of temperatures as the carbon-forming components of the media; and (2) they do not have an organic structure which itself thermally decomposes in a manner prone to producing carbonaceous residues. The criticality of the second requirement is illustrated by the compound disodium diisopropyl naphthalene sulfonate (Aerosol OS) which not only did not act to eliminate the grayish discoloration, but, on the contrary, appeared to increase the tint. It was conjectured that the cyclic (naphthalenic) structure of the compound tended to form carbon during its degradation which, in turn, consumed the available sulfur oxides. Another compound which behaved similarly was sodium alkyl arylsulfonate (Calsoft F-90). Compounds having an aromatic or cyclic organic structure appear to be more likely to produce carbonaceous residues Various non-sulfated and non-sulfonated compounds were investigated such as sodium stearate, sodium lactate, and sodium succinate, but they were ineffective in removing the grayish hue. Ammonium salts of polyacrylic acids were likewise found to be ineffective. Furthermore, stearyl alcohol, polyethylene glycol, butyl carbitol, pine oil, and other sulfur-free organic compounds were investigated, but none appeared to reduce the grayish discoloration significantly.

The following inorganic compounds, including inorganic sulfates, well-recognized as oxidizing agents in the glass field were investigated: $NH_4NO_3$, $Na_2SO_4$, and $BaSO_4$. None appeared to exhibit a significant beneficial effect in reducing grayness.

In summary, only sulfated and sulfonated organic compounds containing sulfur oxide groups have been found to be operable in the present invention, of which the alkali metal and ammonium sulfated and sulfonated compounds are preferred.

PRIOR ART

In light of the ever increasing concern with respect to the toxicity of lead and cadmium, particularly when articles containing those components are used in food and beverage service and storage, the level of research to develop frits free of lead and cadmium displaying properties closely similar to those exhibited by the commercially marketed glazes containing lead and/or cadmium has also increased. The U.S. patents listed below are illustrative of that research, but none describes the subject inventive method.

| | |
|---|---|
| 4,224,074 (Reade) | 4,446,241 (Francel et al.) |
| 4,282,035 (Nigrin) | 4,537,862 (Francel et al.) |
| 4,285,731 (Nigrin) | 4,590,171 (Nigrin) |
| 4,315,778 (Ueno et al.) | 4,814,298 (Nigrin) |
| 4,877,758 (Lee et al.) | |

Ser. No. 07/724,125, supra, is believed to constitute the most relevant prior art in that, although not disclosing the organic compounds containing sulfur oxide groups of the present invention, it does describe the adsorption of an oxidizing agent onto the surfaces of the frit particles prior to firing the frit to fusion.

DESCRIPTION OF PREFERRED EMBODIMENTS

Table I records a list of additives tested at the 1% active ingredient level based on frit weight. These additives included a number of sulfated and sulfonated compounds which, when incorporated in organic vehicles conventionally employed with glazing frits, led to the reduction or total elimination of the grayish discoloration along with several sulfur-free and sulfur-containing compounds which appeared to have little, if any, salutary effect upon removing the grayish discoloration.

TABLE I

| Compound | Trade Name and Company |
|---|---|
| Ammonium Lauryl Sulfate | Stepanol AM<br>Stepan Company<br>Northfield, IL |
| Sodium Lauryl Sulfosuccinate | Incrosul LS<br>Croda Inc.<br>New York, NY |
| Ammonium Laureth Sulfosuccinate | Incrosul LTS<br>Croda Inc.<br>New York, NY |
| Sodium Dioctyl Sulfosuccinate | Octowet<br>Textile Rubber and Chemical Company<br>Dalton, GA |
| Sodium Diisobutyl Sulfosuccinate | Gemtex 445<br>Finetex, Inc.<br>Elmwood Park, NJ |
| Sodium Ditridecyl Sulfosuccinate | Monawet MT-70<br>Mona Industries, Inc.<br>Patterson, NJ |
| Sodium Dihexyl Sulfosuccinate | Monawet MM-80<br>Mona Industries, Inc.<br>Patterson, NJ |
| Sodium Dioctyl Sulfosuccinate | Aerosol OT<br>American Cyanamid Process Chemicals Dept.<br>Wayne, NJ |
| Sulfonated Oleic Acid | Actrasol SR-75<br>Climax Performance Materials Corp.<br>Summit, IL |
| *Highly Sulfonated Fatty Acid Ester | Emkafol D<br>Emkay Chemical Company<br>Elizabeth, NJ |
| *Sulfated Ester | Densol P-82<br>Graden Chemical Company<br>Havertown, PA |
| Sodium Stearate | Proctor & Gamble Company<br>Cincinnati, OH |
| Sodium Lactate | Fisher Scientific Company<br>Rochester, NY |
| Sodium Succinate | Fisher Scientific Company<br>Rochester, NY |
| $NH_4NO_3$ | J. T. Baker Company<br>Phillipsburg, NJ |
| $Na_2SO_4$ (anhydrous) | J. T. Baker Company<br>Phillipsburg, NJ |
| $BaSO_4$ | J. T. Baker Company<br>Phillipsburg, NJ |
| *Cetyl/Stearyl Alcohol and Fatty Alcohol Sulfate | Lanette N<br>Henkel Canada, Ltd.<br>Montreal, Quebec |
| Diamyl Ester of Sodium Sulfosuccinic Acid | Aerosol AY-100<br>American Cyanamid Process Chemicals Dept.<br>Wayne, NJ |
| *Sulfonated Ester | Solusol<br>American Cyanamid Process Chemicals Dept.<br>Wayne, NJ |
| Potassium Perfluoroalkyl Sulfonate | Fluorad FC-95<br>3M Company<br>St. Paul, MN |
| Sodium Alkylaryl Sulfonate | Calsoft F-90<br>Pilot Chemical Company |

TABLE I-continued

| Compound | Trade Name and Company |
|---|---|
| *Petroleum Sulfonate | Santa Fe Springs, CA<br>Actrabase PS-470<br>Climax Performance Materials Corp.<br>Summit, IL |
| *Soap Sulfonate | Actrabase 31-A<br>Climax Performance Materials Corp.<br>Summit, IL |
| *Sulfated Vegetable Oil | Hydrolene 80<br>Reilly-Whiteman, Inc.<br>Conshohocken, PA |
| Sodium Diisopropyl Naphthalene Sulfonate | Aerosol OS<br>American Cyanamid<br>Process Chemical Dept.<br>Wayne, NJ |
| *Sulfated Castor Oil | Laurel R-75<br>Reilly-Whiteman, Inc.<br>Conshohocken, PA |
| *Sulfonated Synthetic Replacement for Castor Oil | Densol 6920<br>Graden Chemical Company<br>Havertown, PA |
| Ammonium Laureth Sulfate | Witcolate S-1300C<br>Witco Corporation<br>New York, NY |
| Sodium Laureth Sulfate | Witcolate S-1285C<br>Witco Corporation<br>New York, NY |
| Sodium Lauryl Sulfate | Polystep B-3<br>Stepan Company<br>Northfield, IL |
| Sodium Cetyl/Stearyl Sulfate | Polystep B-26<br>Stepan Company<br>Northfield, IL |

*A commercially marketed proprietary product with the general chemical structure listed as it appears in the manufacturer's literature.

A lead-free and cadmium-free frit composition has been developed by Corning Incorporated, Corning, N.Y. under the designation E-1809. That frit is encompassed within U.S. Pat. No. 4,590,171 (Nigrin) which discloses frit compositions consisting essentially, expressed in terms of weight percent on the oxide basis, of

| | | | |
|---|---|---|---|
| $Li_2O$ | 3-4 | $Bi_2O_3$ | 0-3 |
| $Na_2O$ | 0.75-3 | CaO | 0-1.5 |
| BaO | 3.5-9.5 | $K_2O$ | 0-2 |
| $B_2O_3$ | 14-17.5 | $Sb_2O_3$ | 0-5 |
| $Al_2O_3$ | 6.75-8.75 | $SnO_2$ | 0-2 |
| $SiO_2$ | 48-55 | SrO | 0-2 |
| $ZrO_2$ | 6.75-10.5 | $TiO_2$ | 0-3 |
| F | 3-4 | ZnO | 0-2.5 |
| $Bi_2O_3$ + CaO + $K_2O$ + $Sb_2O_3$ + $SnO_2$ + SrO + $TiO_2$ + ZnO | | | 0-7.5 |

E-1809 frit, consisting essentially, expressed in terms of weight percent on the oxide basis, of

| | | | | | |
|---|---|---|---|---|---|
| $Li_2O$ | 3.23 | BaO | 7.17 | $TiO_2$ | 2.01 |
| $Na_2O$ | 2.46 | $Al_2O_3$ | 6.78 | $ZrO_2$ | 7.77 |
| CaO | 0.96 | $B_2O_3$ | 15.5 | F | 3.72 |
| ZnO | 1.43 | $SiO_2$ | 48.8 | | | is subject to the grayish discoloration when fired in accordance with the relatively short time, low temperature glazing schedule currently employed with the commercially marketed lead-containing frits. That schedule comprises heating the frit-coated ware from room temperature to about 750°-760° C. within a period of about 5-8 minutes and thereafter air chilling the glazed ware to room temperature. E-1809 and other frit compositions contained within the scope of U.S. Pat. No. 4,590,171, however, required longer maturing times and/or higher firing temperatures to prevent the development of the undesirable grayish tint, both of those procedures adding substantial cost. Nevertheless, because those frit compositions, when matured into a glaze, demonstrated chemical and physical characteristics rendering them ideally suited for decorating CO-RELLE$^R$ tableware marketed by Corning Incorporated, the present research was initiated to discover a means for solving the gray discoloration problem observed in those glazes. Thus, the frit compositions disclosed in U.S. Pat. No. 4,590,171 displayed high gloss; they exhibited linear coefficients of thermal expansion compatible with that of the tableware, viz., about 57-62×10$^{-7}$/°C. over the temperature range of 20°-300° C., and softening points between about 600°-625° C.; and they evidenced excellent resistance to attack by the alkaline detergents used in dishwashers. Inasmuch as the principal goal of the subject research project was to develop frits for decorating CO-RELLE$^R$ tableware, maturation temperatures for the frits below 775° C. were desired, with temperatures no higher than 750°-760° C. being preferred. Furthermore, whereas our laboratory investigations have indicated that the sulfated and sulfonated compounds are operable in inhibiting the development of the problem grayish discoloration during the relatively rapid firing of a wide variety of lead-free frit compositions, because the present invention was especially directed to solving the discoloration phenomenon occurring in the frits included within U.S. Pat. No. 4,590,171, the description below is drawn with particularity to those frits as exemplified in E-1809.

To investigate the operability of a number of prospective additives, two basic techniques were followed:

(1) The additive was mixed into an organic medium Thereafter, E-1809 frit having an average particle size of about 6-7 microns was blended into the mixture of additive and organic medium utilizing a roller mill, the weight ratio frit:mixture being selected for optimum milling. The viscosity of the resultant suspension was then adjusted, e.g., through added medium or a solvent, for suitable application to a substrate.

(2) The additive was dissolved in water or a 1:1 by volume solution of isopropanol and water. E-1809 frit was admixed to that solution and the resulting slurry blended in a roller mill. Subsequently, the solutions were filtered off and the frit allowed to dry, the additive being adsorbed onto the frit particles. The dried, coated frit was then mixed into an organic medium in the proper proportions to produce a slurry having the desired viscosity for application to a substrate.

In both techniques the amount of additive ranged about 0.5-5% by weight (100-1000 m$^2$/g based upon the surface area of the frit).

In the following examples the organic medium comprised either No. 175 screening oil marketed by Drakenfeld Colors, Washington, Pa., or one of two thermoplastic binder systems devised by Corning Incorporated under the designations PT-47 and TAC. PT-47 comprises a thermoplastic screening medium based upon an acrylic resin in a fatty alcohol. TAC comprises a pressure sensitive ink for transfer printing as described in U.S. Pat. No. 4,472,537 (Johnson et al.). In the table below the additives were mixed into the medium prior to the blending thereinto of the frit.

The frits admixed into the screening oil were silk screened onto 6.5" (~16.5 cm) diameter CORELLE[R] plates and thereafter fired to a matured glaze by heating from room temperature (R.T.) to 750°-760° C. within 5.5 minutes and then air chilled to room temperature. The PT-47 and TAC media were preheated in a microwave oven to achieve the desired fluidity therein to permit admixing the frit. In all cases after stirring the frit into the media, the resultant pastes were 3-roll milled to insure a homogeneous blend. The frit/PT-47 and frit/TAC mixtures were applied to 6.5" (~16.5cm) diameter plates via silk screening or doctor blading a thin film (~1 mm thick) thereon. The samples were subsequently fired to 750°-760° C. within 8 minutes and then air chilled to room temperature. Table II below records the extent of grayness as qualitatively evaluated visually.

TABLE II

| Compound | Medium | Appearance |
|---|---|---|
| Stepanol AM | PT-47 | None |
|  | TAC | Slight |
| Incrosul LS | PT-47 | None |
|  | TAC | Slight |
| Incrosul LTS | PT-47 | None |
|  | TAC | Slight |
| Octowet | PT-47 | None |
|  | TAC | None |
| Gemtex 445 | PT-47 | None |
|  | TAC | Slight |
| Monawet MT-70 | PT-47 | None |
|  | TAC | None |
| Monawet MM-80 | PT-47 | None |
|  | TAC | None |
| Aerosol OT | PT-47 | None |
|  | TAC | None |
| Actrasol SA-75 | PT-47 | None |
|  | TAC | Slight |
| Emkafol D | PT-47 | None |
|  | TAC | None |
| Densol P-82 | PT-47 | None |
|  | TAC | Slight |
| Sodium Stearate | PT-47 | Gray |
|  | TAC | Gray |
| Sodium Lactate | PT-47 | Gray |
|  | TAC | Gray |
| Sodium Succinate | PT-47 | Very Gray |
|  | TAC | Very Gray |
| $NH_4NO_3$ | PT-47 | Very Gray |
|  | TAC | Very Gray |
| $Na_2SO_4$ (anhydrous) | 175 Oil | Gray |
|  | PT-47 | Gray |
| $BaSO_4$ | 175 Oil | Gray |
|  | PT-47 | Gray |
| Lanette N | 175 Oil | Slight |
|  | PT-47 | Slight |
| Aerosol OS | 175 Oil | Very Gray |
|  | PT-47 | Very Gray |
| Aerosol AY-100 | 175 Oil | Very Gray |
|  | PT-47 | None |
| Solusol | 175 Oil | Gray |
|  | PT-47 | None |
| Fluorad FC-95 | 175 Oil | Gray |
|  | PT-47 | None |
| Calsoft F-90 | 175 Oil | Very Gray |
|  | PT-47 | Very Gray |
| Actrabase PS-470 | 175 Oil | Very Gray |
|  | PT-47 | Gray |
| Actrabase 31-A | 175 Oil | Very Gray |
|  | PT-47 | Gray |
| Hydrolene 80 | 175 Oil | None |
|  | PT-47 | None |
| Laurel R-75 | 175 Oil | None |
|  | PT-47 | None |
| Densol 6920 | PT-47 | None |
|  | TAC | Slight |
| Witcolate S-1300C | PT-47 | None |
|  | TAC | None |
| Witcolate S-1285C | PT-47 | None |
|  | TAC | Slight |
| Polystep B-3 | PT-47 | None |
|  | TAC | None |
| Polystep B-26 | PT-47 | Slight |
|  | TAC | Slight |

None = essentially free of gray
Slight = slightly gray, much less gray than E-1809 alone
Gray = equivalent gray to E-1809 alone
Very Gray = more gray than E-1809 alone In like manner to the description in Ser. No. 07/724,125 supra, the inventive additives may be first adsorbed onto the surface of the frit particles and the coated frit particles then blended into the organic medium. Whereas that practice may in certain instances result in further reducing the level of grayish discoloration, the practice is not necessary to assure the removal of the discoloration, as is illustrated above in Table II where the grayness was eliminated by simply blending the additive into the organic medium and subsequently admixing the frit therein.

Nevertheless, as can be observed from Tables I and II, the presence of a sulfur oxide group to act as an oxidizing agent is vital to the operability of the present invention.

We claim:

1. In a method for eliminating the grayish discoloration which develops when lead-free and cadmium-free glass frit particles are applied to a substrate by means of an organic vehicle and fused to form a glaze, which discoloration is the result of a carbonaceous residue, said method comprising the steps of:
    (a) preparing lead-free and cadmium-free glass frit particles of a desired composition;
    (b) forming a suspension of said frit particles in an organic vehicle;
    (c) applying said suspension onto a substrate; and
    (d) firing said suspension to burn off said vehicle and to fuse said frit particles into a glaze;
the improvement comprising adsorbing a coating of an organic compound containing at least one sulfur oxide group as an oxidizing agent onto the surface of said frit particles such that, upon firing said suspension, said organic compound is burned out and the carbonaceous residue is oxidized to thereby eliminate said grayish discoloration.

2. A method according to claim 1 wherein said coating of an organic compound containing at least one sulfur oxide group is adsorbed onto said frit particles prior to the formation of said suspension.

3. A method according to claim 1 wherein said coating of an organic compound containing at least one sulfur oxide group is adsorbed onto said frit particles during the formation of said suspension.

4. A method according to claim 1 wherein the burn-out temperature of said organic compound containing at least one sulfur oxide group is in the same range of temperatures as those of the constituents of the organic vehicle.

5. A method according to claim 1 wherein said organic compound containing at least one sulfur oxide group does not have an organic structure which forms sufficient carbonaceous residue upon burning out such that the carbon formed consumes the sulfur oxide group(s).

6. A method according to claim 5 wherein said organic compound which forms a carbonaceous residue upon burning out has an organic structure selected from the group consisting of aromatic and cyclic structures.

7. A method according to claim 1 wherein said organic compound containing at least one sulfur oxide group is selected from the group consisting of sulfated and sulfonated organic compounds.

8. A method according to claim 7 wherein said organic compound is selected from the group consisting of an alkali metal salt of a sulfated or sulfonated organic compound and an ammonium salt of a sulfated or sulfonated organic compound.

9. A method according to claim 8 wherein said organic compound does not have an organic structure which forms a carbonaceous residue upon burning out.

10. A method according to claim 1 wherein said glass frit consists essentially, expressed in terms of weight percent on the oxide basis, of

| | | | |
|---|---|---|---|
| $Li_2O$ | 3–4 | $Bi_2O_3$ | 0–3 |
| $Na_2O$ | 0.75–3 | CaO | 0–1.5 |
| BaO | 3.5–9.5 | $K_2O$ | 0–2 |
| $B_2O_3$ | 14–17.5 | $Sb_2O_3$ | 0–5 |
| $Al_2O_3$ | 6.75–8.75 | $SnO_2$ | 0–2 |
| $SiO_2$ | 48–55 | SrO | 0–2 |
| $ZrO_2$ | 6.75–10.5 | $TiO_2$ | 0–3 |
| F | 3–4 | ZnO | 0–2.5 |
| $Bi_2O_3 + CaO + K_2O + Sb_2O_3 + SnO_2 + SrO + TiO_2 + ZnO$ | | | 0–7.5 |

11. A method according to claim 10 wherein said glass frit exhibits a maturation temperature below 775° C.

12. A method according to claim 11 wherein said frit particles are fused into a glaze by heating from room temperature to about 750°–760° C. within a period of about 5–8 minutes and thereafter cooling to room temperature.

* * * * *